(12) United States Patent
Novak et al.

(10) Patent No.: US 6,540,389 B1
(45) Date of Patent: Apr. 1, 2003

(54) LIGHTING SYSTEM FOR ILLUMINATION OF AN OBSERVATION SPACE

(75) Inventors: Pavel Novak, Schaffhausen (CH); Manfred Kuster, Schaffhausen (CH); Harald Haan, Schaffhausen (CH); Beat Krattiger, Beringen (CH)

(73) Assignee: Storz Endoskop GmbH (CH)

( * ) Notice: Subject to any disclaimer, the term of this patent is extended or adjusted under 35 U.S.C. 154(b) by 0 days.

(21) Appl. No.: 09/656,384

(22) Filed: Sep. 6, 2000

Related U.S. Application Data

(63) Continuation of application No. PCT/EP99/01501, filed on Mar. 9, 1999.

(30) Foreign Application Priority Data

Mar. 10, 1998 (DE) .......................................... 198 10 184

(51) Int. Cl.⁷ ................................................. G02B 6/00
(52) U.S. Cl. ....................... 362/551; 362/556; 362/557; 362/581; 362/582
(58) Field of Search ................................ 362/556, 581, 362/582, 557; 385/136, 12, 139, 76, 77, 138, 301

(56) References Cited

U.S. PATENT DOCUMENTS

| | | | |
|---|---|---|---|
| 2,424,064 A | 7/1947 | Stegeman | 240/2.18 |
| 3,051,035 A | 8/1962 | Root | 83/1 |
| 4,408,827 A * | 10/1983 | Guthrie et al. | 350/96.1 |
| 4,746,189 A * | 5/1988 | Arrington et al. | 385/139 |
| 4,782,430 A | 11/1988 | Robbins et al. | 362/32 |
| 5,870,511 A * | 2/1999 | Sawarti et al. | 385/12 |
| 5,923,808 A * | 7/1999 | Melling | 385/139 |
| 6,045,259 A * | 4/2000 | Djeu | 374/161 |

FOREIGN PATENT DOCUMENTS

| | | |
|---|---|---|
| DE | 31 51 527 A1 | 7/1983 |
| DE | 44 04 247 A1 | 8/1995 |
| DE | 198 10 184 A1 | 9/1999 |
| EP | 0 533 987 A1 | 3/1993 |
| EP | 0 703 405 A1 | 9/1995 |

* cited by examiner

*Primary Examiner*—Sandra O'Shea
*Assistant Examiner*—Anabel Ton
(74) *Attorney, Agent, or Firm*—St. Onge Steward Johnston & Reens LLC

(57) ABSTRACT

A lighting system for illumination of an observation space, especially an observation space in which a pressurized and/or hot medium is contained, comprises an optical-fiber cable, one end of which can be connected to a light source, and a lighting head, which is connected to the other end of the optical-fiber cable and whose distal end can be introduced into the observation space through an opening in a wall enclosing the observation space. The lighting head comprises a light guide rod made from a pressure and/or temperature-resistant material.

23 Claims, 3 Drawing Sheets

LIGHTING SYSTEM FOR ILLUMINATION OF AN OBSERVATION SPACE

CROSS REFERENCE TO PENDING APPLICATION

This is a continuation of pending International Application PCT/EP99/01501 filed on Mar. 09, 1999, which designates the United States.

BACKGROUND OF THE INVENTION

The present invention generally relates to a lighting system for illumination of an observation space, especially an observation space in which a pressurized and/or hot medium is contained.

A lighting system of this type is generally known. Lighting systems of the before-mentioned kind are used for illuminating an observation space, such as a reaction chamber or a combustion chamber in which chemical reactions, combustion processes or other physical or chemical processes take place, in order to display the development of the process outside the observation space, for example on a display unit.

A lighting system of this kind finds special application in the illumination of the combustion chamber of a combustion engine of a motor vehicle. In engine development and also in engine testing such lighting systems are used in combination with an observation system, for example a technical endoscope, for displaying the fuel injection process and the distribution of the mixture with the engine in running condition. As the observation system, i.e. the endoscope, normally works without a separate light supply, it is a requirement that the combustion chamber be illuminated with the aid of the lighting system in order to have the possibility to observe the mixture-forming processes taking place in the cylinder of the engine, which as such are not self-lighting.

To this end, an opening, i.e. a bore, is provided in the wall of the cylinder head, through which the front, i.e. the distal end of a lighting head of the lighting system is guided, whereafter the opening through which the lighting head has been introduced into the combustion chamber is sealed in a suitable way to prevent the escape of combustion gases. For observing the combustion chamber, being illuminated by the lighting system, the endoscope is introduced through a corresponding second bore provided in the cylinder head.

The lighting head is connected, via an optical-fiber cable, to a light source, for example a stroboscopic light source. The light generated by the light source is transmitted through an optical-fiber cable to the lighting head, where it emerges from the lighting head at the distal end, which latter has been introduced into the combustion chamber. For transmission of the light from the light source to the free end of the lighting head, the optical-fiber cable comprises optical fibers or optical fiber bundles.

In conventional lighting systems such optical fiber bundle is run to the distal end of the lighting head. At the distal end, the individual optical fibers are cemented together by an adhesive.

However, such a lighting system is connected with certain disadvantages. The optical fibers at the distal end of the lighting head must not get into contact with the combustion gases in the combustion chamber of the engine because the optical fibers as such, and their sealing compound as well, are resistant neither to pressure nor to high temperatures. But in the combustion chamber of an engine extremely high pressures of more than 100 bar and high temperatures, that may well exceed 200° Celsius, prevail in the running condition of the engine. In order to protect the optical fibers from the high temperatures and the high pressures, conventional lighting systems must, therefore, be used in combination with a cup-shaped protective glass that is inserted into the opening in the wall of the combustion chamber and into which the lighting head is introduced. The use of a protective glass necessitates a bore in the cylinder head of 14 mm diameter, for the installation of the protective glass. While an opening of such a diameter was no problem with older engines, applying a bore of such a diameter in the cylinder head is no longer possible with new multi-valve engines, due to space restraints that result from the particular structural conditions. Making the total arrangement, comprising the protective glass and the lighting head, smaller would of course be possible, but would considerably reduce the light-transmission capacity and make the illumination of the observation space less effective.

In addition to the use of a protective glass it is further necessary, with conventional lighting systems, to cool the distal end of the lighting head since the protective glass, while preventing direct contact between the optical fibers and the combustion gases, does not prevent the transmission of heat radiation. The heat radiation passing the protective glass subjects the distal end of the optical fibers to high temperatures, which cause damage to the fibers and in particular to their sealing compound. Conventional lighting systems therefore require an additional cooling circuit with supply and discharge systems in the lighting head, which occupy a large part of the cross-section of the lighting head so that only a small cross-section of approximately 3.5 mm diameter remains for the optical fibers while the effective outer diameter of the lighting head is approximately 7.5 mm so that the theoretical light-transmission capacity of the lighting head is poorly utilized. And there is further the risk that in case the cooling system should fail, the optical fibers at the distal end of the lighting head and, thus, the entire lighting system may be destroyed.

Now, it is the object of the present invention to improve a lighting system of the before-mentioned type so that the disadvantages described above are avoided and the lighting system can be used without a protective glass and without a cooling system, without the risk that extreme pressure or temperature influences may cause damage to the lighting head.

SUMMARY OF THE INVENTION

With respect to the lighting system described at the outset, the invention achieves this object by providing a lighting system, comprising
  an optical-fiber cable having a first end which can be connected to a light source, and a second end;
  a lighting head, which is connected to said second end of said optical-fiber cable and which can be introduced into said observation space,
wherein said lighting head comprises a light guide rod made from a material which is resistant to pressure and temperature.

In the lighting system according to the invention, the optical-fiber bundle of the optical-fiber cable, instead of being guided up to the distal end of the lighting head, is therefore replaced at the lighting head by a light guide rod made from a pressure and/or temperature-resistant material. The sensitive optical fibers are, thus, located outside the observation space and are no longer exposed to the damaging influences of pressure and temperature. The light guide rod provides the advantage that there are no glued joins or cemented areas at its distal end, which project into the observation space and which might deteriorate under the effect of pressure or high temperatures. By equipping the lighting head with a light guide rod made from a pressure and/or highly temperature-resistant material, the need for a protective glass and also for cooling of the lighting head is eliminated. The light guide rod may consist of a suitable transparent glass that may come in contact with the combustion gases in the combustion chamber of a combustion engine without being damaged thereby. Due to the fact that no protective glass is required any more as protection for the lighting head, the diameter of the opening in the wall of the observation space may be reduced, for example, to 10 mm so that the lighting system according to the invention can be used also with modern multi-valve engines where a bore of larger diameter cannot be applied. In order to permit the diameter of the opening to be reduced, no scaling-down of the lighting head, which would reduce its light-transmission capacity, is required with the lighting system according to the invention. While in conventional lighting systems, due to the cooling requirement, cooling channels are provided on the lighting head which heavily reduce the cross-section of the lighting head that can be used for light transmission, another advantage of the lighting system according to the invention lies in the fact that the entire cross-section of the light guide rod is available for light transmission so that the light-transmission capacity of the lighting system according to the invention is substantially increased compared with conventional lighting systems. The light guide rod may, therefore, have the same diameter as the optical fiber bundle in the optical-fiber cable. While with conventional lighting systems only a diameter of approximately 3.5 mm is available in the lighting head for the optical fibers, the light guide rod of the lighting system according to the invention may be given a diameter of more than 6 mm which quadruplicates the light efficiency, compared with conventional lighting systems. Suited as material for the light guide rod are, in principle, all heat-resistant glasses with high transparency.

According to a preferred embodiment, the light guide rod is detachably connected to the optical-fiber cable.

This feature provides the advantage to make the light guide rod exchangeable. While in conventional lighting systems the entire lighting system is rendered unserviceable when the optical fibers, that are guided up to the distal end of the lighting head, get damaged, the invention now teaches to connect the lighting head detachably to the optical-fiber cable. In case of damage, caused for example by impact, the low-cost light guide rod can be replaced, while the expensive and temperature-sensitive optical-fiber cable can be connected to a new lighting head and can be used again. This reduces the costs of repair of the lighting system according to the invention. Another advantage of the detachable connection between the light guide rod and the optical-fiber cable is seen in the fact that it is now possible to provide a set of exchangeable light guide rods, intended for example for different illumination directions. The lighting system according to the invention, therefore, offers an advantageous modular structure. In contrast, it was a requirement with conventional lighting systems to have available a separate complete lighting system for each lighting direction, which led to correspondingly high costs.

According to a further preferred embodiment, the light guide rod is provided at its proximal end with a coupling sleeve for connecting the light guide rod with the optical-fiber cable.

This feature offers the advantage that the coupling sleeve allows an easy-to-handle, detachable connection to be realized between the light guide rod and the optical-fiber cable. If more than one light guide rods are provided for the lighting system according to the invention, for different illumination directions, each light guide rod is provided at its proximal end with a corresponding coupling sleeve so that rapid exchange of the different light guide rods is rendered possible.

It is preferred in this connection if the coupling sleeve is fixed to the light guide rod by means of an adhesive, with the refractive index of the adhesive being smaller than the refractive index of the light guide rod.

As the coupling sleeve, preferably, is made from a metal, fixing the coupling sleeve on the light guide rod can be effected most safely by gluing. Given the fact that the join between the coupling sleeve and the proximal end of the light guide rod is outside the observation space in operation, the join is not exposed to the extreme temperatures that might prevail in the observation space, but only to lower temperatures so that there does not exist any risk that a join may get detached under the effect of heat. Losses during light transmission through the light guide rod are avoided in the area of the coupling sleeve by the fact that the adhesive has a refractive index smaller than the refractive index of the light guide rod. Due to the use of an adhesive having a refractive index smaller than the refractive index of the light guide rod, the total refraction, by the surface of the light guide rod, of the light guided through the light guide rod, which is required for the light transmission through the light guide rod, is maintained. Consequently, the system advantageously provides on the one hand safe fastening of the coupling sleeve on the light guide rod, without any light losses occurring at the join between the coupling sleeve and the light guide rod. However, it may also be envisaged to solder the coupling sleeve to the light guide rod by means of a metal/glass soldering process.

According to a further preferred embodiment, the adhesive is resistant to high temperatures.

This feature offers the advantage that in the event heat should be transmitted to the adhesive through metal parts of the lighting head, the adhesive will not lose its adhesive properties under the effect of such heat so that, consequently, the join between the light guide rod and the coupling sleeve will not get detached.

According to a further preferred embodiment, the adhesive is transparent at least in the area near the surface of the light guide rod.

By making the adhesive transparent at least in the area near the surface of the light guide rod, it is prevented that part of the light may get absorbed by the adhesive at the transition between the surface of the light guide rod and the adhesive. Consequently, the entire light intensity guided through the light guide rod will be transmitted by total reflection up to the distal end of the light guide rod.

According to a further preferred embodiment, the adhesive is formulated on a silicone basis.

The use of a silicone-based adhesive provides the advantage that silicone on the one hand has a lower refractive index than glass and, on the other hand, is resistant to high temperatures. Another advantage lies in the fact that a transparent adhesive can be made on the basis of silicone. Another advantage of a silicone-based adhesive derives from the fact that silicone can be produced at low cost.

According to a further preferred embodiment, the coupling sleeve encloses the light guide rod up to approximately its distal end.

This feature provides the advantage that the coupling sleeve protects the light guide rod from impacts. This avoids the formation of notches in the surface of the light guide rod, which could impair its light-transmission capacity due to impairment of the total reflection caused by surface irregularities.

According to a further preferred embodiment, a supporting surface, supporting the proximal end face of the light guide rod in axial direction, is formed in the coupling sleeve.

This feature provides the advantage that the light guide rod is prevented from getting displaced axially in proximal direction under the effect of the high pressure prevailing in the observation space, whereby the light guide rod is prevented from being pressed against the distal end of the optical fibers and from damaging the latter.

According to a further preferred embodiment, the light guide rod is metallized on at least part of its surface.

This feature provides the advantage that the distribution of the light emerging from the distal end of the light guide rod can be optimized by the metallization on the surface of the light guide rod, especially when the metallization is provided on the distal end of the light guide rod. The metallization acts as a mirror that allows coupling-out of the light from the distal end of the optical fiber bundle in a desired direction.

It is preferred in this connection if the metallization is formed from a metal that is resistant to high temperatures and/or if the metallization is covered by a protective coating.

This feature provides the advantage that the metallization cannot be damaged by the effect of the high temperatures that may prevail in the observation space.

According to a further preferred embodiment, the light guide rod is provided with a plane or curved ground surface at its distal end.

This feature provides the advantage that the light distribution of the light emerging from the distal end of the light guide rod can be influenced in a desired way without any metallizations being required for this purpose that may under certain circumstances not withstand the high temperatures prevailing in the observation space.

It is preferred in this connection if the ground surface is plane and forms with the side line of the light guide rod a vertex angle in the range of between 20° and 90°.

This feature provides the advantage that an oblique plane ground surface permits an almost punctiform light exit to be achieved at the vertex of the ground surface. This provides the additional advantage that the depth of penetration of the distal end of the light guide rod into the observation space, required for illuminating the operating space, can be minimized, and this in turn makes it possible, in an advantageous way, to minimize disturbing influences on the processes taking place in the observation space and the thermal load acting on the point of the light guide rod as well.

According to a further preferred embodiment, the light guide rod is made from a heat-insulating material.

This feature provides the advantage that no or only little heat is transmitted from the observation space in proximal direction, so that temperature-sensitive parts of the lighting system arranged outside the combustion chamber, such as the distal ends of the optical fibers, are not impaired by the effect of heat.

According to a further preferred embodiment, the light guide rod is made from quartz glass.

Quartz glass on the one had provides the advantage of being highly transparent so that the light can be guided into the observation space with high transmission capacity. Another advantage of quartz glass lies in the fact that it is heat-insulating. In addition, quartz glass has a small coefficient of temperature expansion, so that the high temperature gradient between the distal end of the light guide rod, which is introduced into the observation space, and its proximal end arranged outside the observation space does not result in any critical stresses in the light guide rod. In addition, quartz glass has the advantage that it is transparent across the entire optical spectrum, from infrared to ultraviolet, which makes the lighting system according to the invention also suited for spectro-scopic applications.

According to a further preferred embodiment, a rigid spacer in the form of a shaft is arranged between the lighting head and the optical-fiber cable, the light guide rod being detachably connected with the spacer.

This feature provides the advantage that the lighting head can be easily introduced into the opening in the wall of the observation space. Preferably, the dimensions of the spacer are such that the spacer rises above any components located outside the observation space, for example supply and discharge lines of a combustion engine. By fixing the light guide rod detachably on the spacer, the light guide rod can be pre-assembled with the spacer and, thus, connected to the optical-fiber cable, prior to being introduced into the opening of the observation space.

It is preferred in this connection if an insert is provided that can be fixed in the opening in the wall of the observation space outside the latter, in which case the spacer can be slid into the insert and can be fixed at the proximal end of the latter by means of a mounting element.

This feature, together with the preceding feature, further improves the operating ease of the lighting system according to the invention. The insert can at first be fitted in the opening in the wall of the observation space and can be fixed in the opening, for example, by a threaded connection. Thereafter, the spacer, which is connected to the optical-fiber cable and on which the light guide rod had been mounted before, for example by means of the before-mentioned coupling sleeve, is slid into the insert and fixed at its proximal end by means of the mounting element. The step of fixing the spacer by means of the mounting element can be carried without being hindered by any components located outside the observation space, as the spacer ensures that a suitable spacing remains to the wall of the observation space.

It is preferred in this connection if the mounting element is captively held on the spacer.

This feature has the effect to further improve the operating ease during assembly of the modular lighting system.

According to a further preferred embodiment, the mounting element is a cap nut or a bayonet ring.

A cap nut or a bayonet ring constitute, advantageously, structurally simple and easy-to-operate mounting elements.

According to a further preferred embodiment, the coupling sleeve and the distal end of the spacer can be connected by screwing.

This feature provides the advantage that the light guide rod can be connected quickly and easily with the spacer and, thus, the optical-fiber cable through the coupling sleeve.

According to a further preferred embodiment, the lighting system is designed for spectroscopically coupling-out light from the observation space.

This feature provides the advantage that the lighting system according to the invention not only permits light to be directed into the observation space, but also allows light to be coupled out from the observation space for being then subjected to spectral analysis. This is useful, especially, when studying combustion processes, for example for the spectroscopic examination of flames in combustion chambers.

In a preferred application, the lighting system according to the invention is used for illuminating a combustion chamber of a combustion engine and/or for spectroscopically coupling-out light from the combustion chamber.

According to a further preferred embodiment, the lighting system according to the invention is used for illuminating a reaction chamber in chemical industry and/or for coupling out light from such a chamber.

In a further preferred application, the lighting system according to the invention is used for illuminating a reactor of a nuclear power station.

Further advantages are evident from the description and from the appended drawings.

It is understood that the features recited above and those yet to be explained below can be used not only in the respective combinations indicated, but also in other combinations or in isolation, without leaving the scope of the present invention.

An exemplary embodiment of the invention is shown in the drawings and will be explained in more detail in the description below.

DETAILED DESCRIPTION OF A PREFERRED EMBODIMENT

Figure 1:
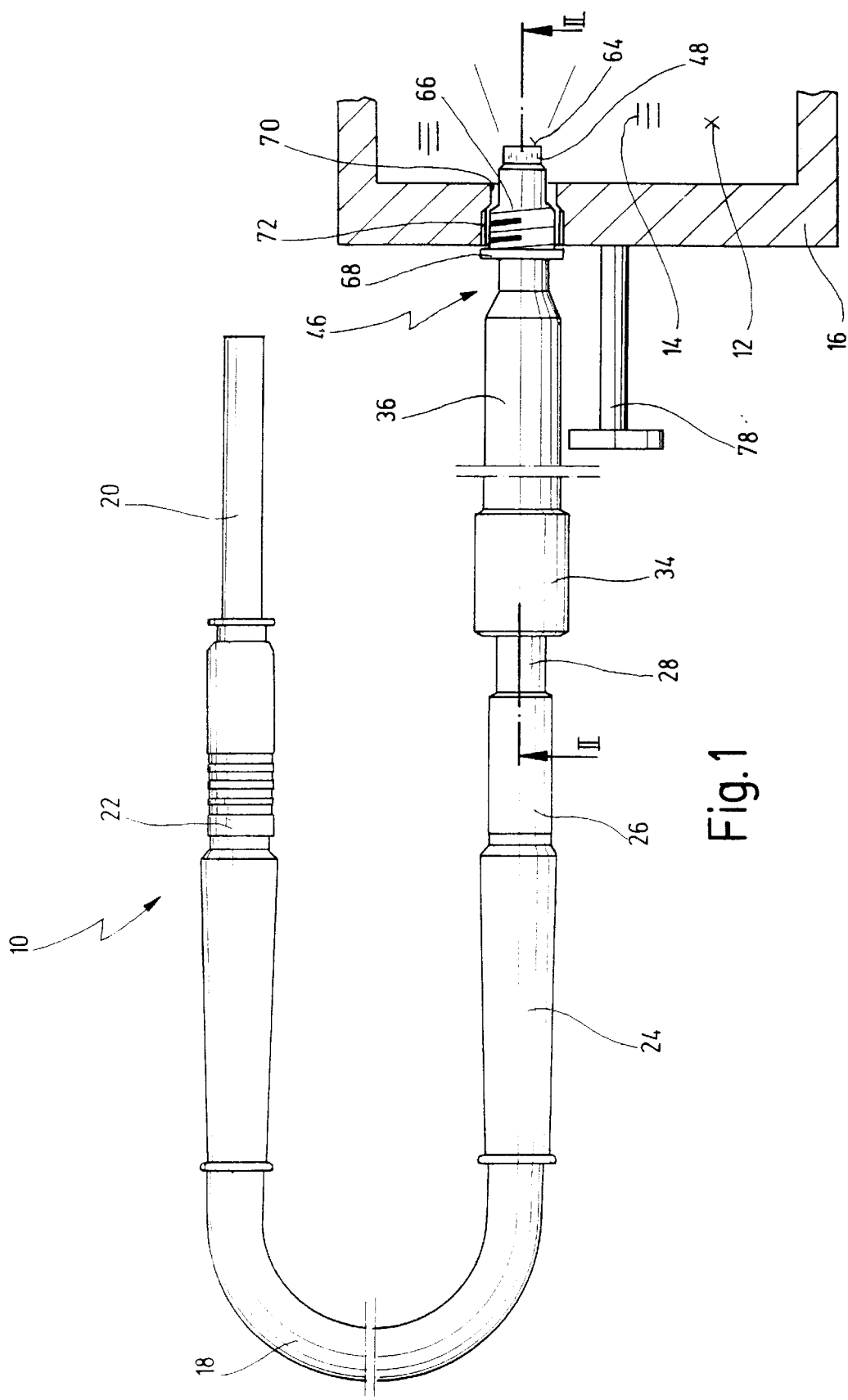
FIG. 1 shows a lighting system according to the invention for illuminating an observation space.
Figure 2:
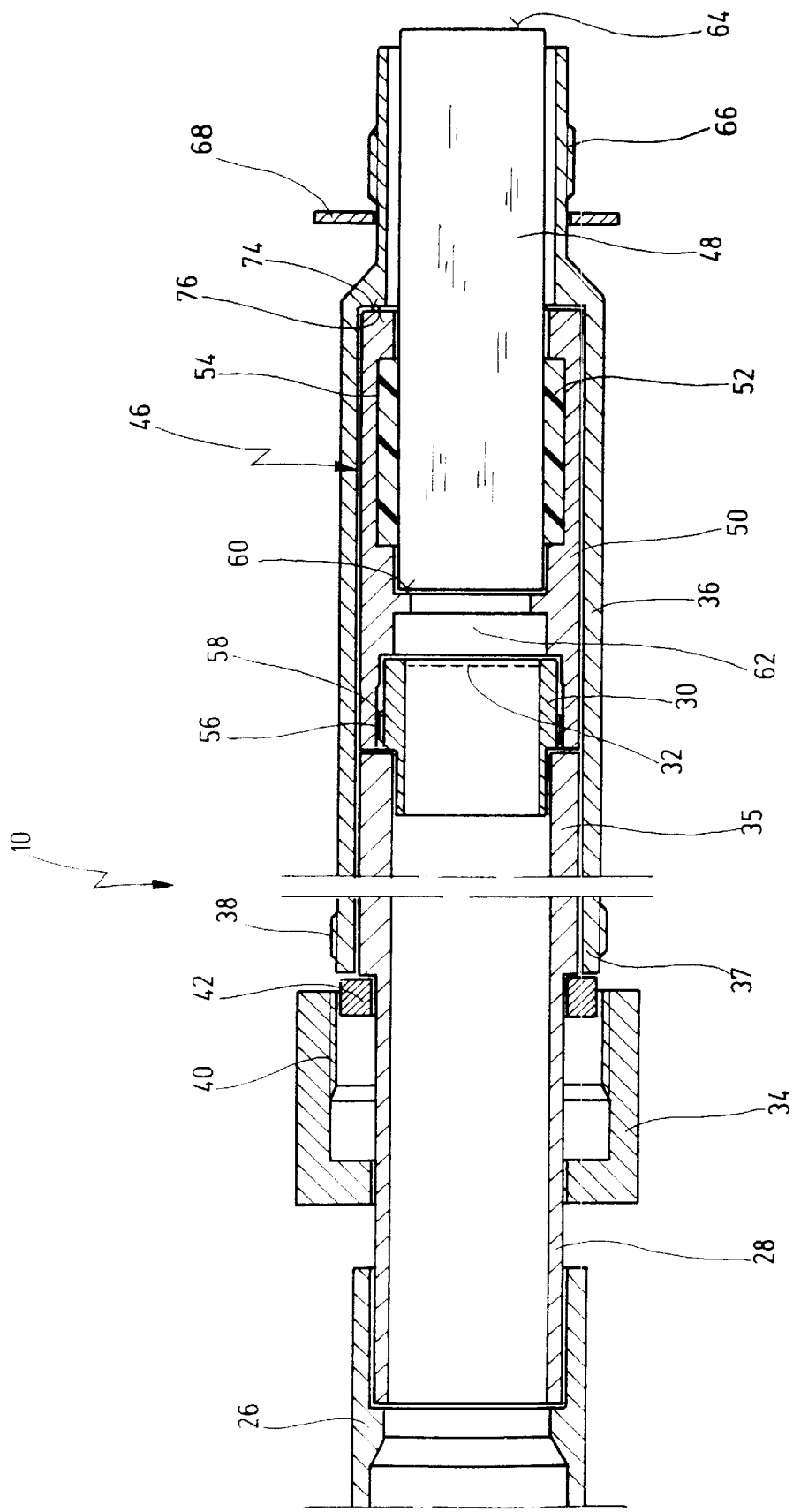
FIG. 2 shows a lengthwise section through the distal end of the lighting system according to FIG. 1, taken along line II—II in FIG. 1.

FIGS. 1 and 2 show a lighting system, generally designated by reference numeral 10, intended for illuminating an observation space 12. The observation space 12 contains a highly pressurized and/or hot medium 14. The observation space 12 constitutes, for example, a combustion chamber of a combustion engine that is fully enclosed by a wall 16, i.e. a housing. The wall 16 constitutes the cylinder head housing. The wall 16 is not shown in FIG. 2.

The lighting system 10 comprises an optical-fiber cable 18. The optical-fiber cable 18 is flexible. The proximal end of the optical-fiber cable 18 carries a plug connector 20 by means of which the optical-fiber cable 18 can be connected to a light source, not shown. The plug connector 20 is firmly connected with the optical-fiber cable 18 via a plug housing 20. The optical-fiber cable 18 has a length of approximately 1.5 m to 2.5 m.

Inside the optical-fiber cable 18, optical fibers or optical fiber bundles, not shown, with an overall cross-section of approximately 6 mm are found. On its distal end, the optical-fiber cable 18 carries a plastic sleeve 24 that is firmly connected with a metal sleeve 26.

A rigid tubular spacer 28, configured as shaft, is firmly connected with the metal sleeve 26. The distal end of the spacer 28 carries another metal sleeve 30, which is firmly connected with the distal end of the spacer 28. The optical fibers or optical fiber bundles running through the optical-fiber cable 18 are guided through the spacer 28 and end in the metal sleeve 30 at the latter's distal end, the end face of the optical fibers being indicated by a broken line 32. The optical fibers fill substantially the entire cross-section of the metal sleeve 30, with a diameter of approximately 6 mm. The ends of the optical fibers are cemented together at the line 32, and are ground and high-polished.

A mounting element 34 in the form of a cap nut is arranged around the spacer 28.

The spacer 28 is inserted with its distal end 35 into the proximal end 37 of an insert 36 of tubular shape. The spacer 28 is fixed to the insert 36 by means of the mounting element 34. To this end, an outer thread 38 is provided on the proximal end 37 of the insert 36, while the mounting element 34 is provided with a corresponding internal thread 40. FIG. 1 shows a condition in which the mounting element 34 is screwed onto the insert 36, whereas in FIG. 2 the mounting element 34 is detached from the insert 36. Accordingly, the spacer 28 can be pulled off the insert 36 after the mounting element 34 has been screwed off the insert 36, as shown in FIG. 2.

The plug connector 20, the plug housing 22, the optical-fiber cable 18, the spacer 28 and the metal sleeve 30, as well as the mounting element 34 and the optical fibers that extend up to the line 32, form a firmly connected single component. The mounting element 34 is captively held on the spacer 28 due to the fact that the distal end of the metal sleeve 26 forms a proximal stop, while a ring 42, likewise firmly connected with the spacer 28, forms a distal stop for the mounting element 34. The ring 42 further acts as axial guide for the mounting element 34 which can be axially displaced on the spacer 28 when it is not screwed onto the insert 36.

A lighting head 46 is arranged on the distal end of the lighting system 10.

The lighting head 46 comprises a light guide rod 48 made from a pressure and/or temperature-resistant material, namely from a highly transparent quartz glass. Further, the light guide rod 48 has a solid cylindrical shape. The light guide rod 48 is further heat-insulating so that the distal end of the light guide rod 48, which projects into the observation space 12 and which, therefore, is exposed to high temperatures, transmits no or only little heat to the proximal end.

A coupling sleeve 50 is undetachably mounted on the light guide rod 48. The undetachable connection between the coupling sleeve 50 and the light guide rod 48 is realized with the aid of an adhesive 52 contained, and hardened, in a circumferential recess in the coupling sleeve 50. The adhesive 52 is formulated on the basis of silicone. Further, the adhesive 52 is highly temperature-resistant and transparent, at least in the area near the surface of the lighting head 48. Further, the adhesive 52 has a refractive index smaller than the refractive index of the quartz glass of the light guide rod 48.

The proximal end of the coupling sleeve 50 is provided with an internal thread 56 that is screwed upon an external thread 58 of the metal sleeve 30. As a result of this arrangement, the light guide rod 48 is detachably connected with the optical-fiber cable 18, which in turn is firmly connected with the metal sleeve 30 via the spacer 28.

The coupling sleeve 50 further comprises a support surface 60 in the form of an annular surface provided in the coupling sleeve 50, which serves the proximal end of the light guide rod 48 as axial bearing surface, in proximal direction.

In the assembled condition, the proximal end of the light guide rod 48 is slightly spaced from the distal end of the optical fibers, as indicated by the line 32. In order to avoid reflection losses at the proximal end face of the light guide rod 48, during input coupling, a space 62 between the distal end of the optical fibers and the proximal end of the light guide rod 48 may be filled up with an optical coupling medium, for example a highly transparent silicon rubber. It is, however, also possible to provide the end of the optical fibers at the line 32 and/or the distal end face of the light guide rod 48 with a dielectric anti-reflection coating.

At the distal end, the light guide rod 48 is provided with a ground surface 64. The ground surface 64 is plane, but may also be curved.

The distal end of the insert 36 is provided with an external thread 66. Further, a sealing washer 68, firmly connected with the insert 36, is arranged on the proximal end of the thread 66.

Hereafter, the assembly of the lighting system 10 for illumination of the observation space 12 will be described:

Before assembly begins, the following separate components are present: The first component comprises the optical-fiber cable 18 with the plug connector 20 and the spacer 28 with the metal sleeve 30, all of which are firmly connected one with the other, as has been mentioned before. Further, the mounting element 34 is part of this component, being mounted on the spacer 28 loosely but undetachably. The second component is formed by the lighting head 46, comprising the light guide rod 48 and the coupling sleeve 50 fixed thereon. The third component is formed by the insert 36.

To begin with, a through-hole is drilled into the wall 16 of the observation space 12, whereafter a thread 72 is cut into the opening 70.

Then the lighting head 46 is connected with the optical-fiber cable 18, by screwing the coupling sleeve 50 onto the metal sleeve 30, which latter is firmly connected with the spacer 28.

As a next step, the insert 36 is screwed with its thread 66 into the opening 70, sealing of the opening 70 being ensured by the sealing washer 68. The insert 36 is thereby fixed in the opening 70. The lighting head 46, being coupled to the spacer 28 and, thus, to the optical-fiber cable 18, is then slid into the insert until a distal bearing surface 74 of the coupling sleeve 50 comes to bear against the proximal support surface 76 of the insert 36. During the same operation, the distal end 35 of the spacer 28 is likewise slid into the insert 36. Thereafter, the mounting element 34, in the form of a cap nut, is screwed onto the thread 38 of the insert 36, whereby the spacer 28 is fixed on the insert 36. The whole assembly comprising the spacer 28 and the lighting head 46 is now fixed on the insert 36 which in its turn is fixed in the opening 70 in the wall 16 of the observation space 12. The plug connector 20 is connected to the light source, whereafter the observation space 12 is illuminated by the light emerging from the ground surface 64. But light not only can be supplied into the observation space 12, but can also be received from the latter by the light guide rod 48, which light is then guided in proximal direction for spectroscopic analysis.

The length of the spacer 28 is selected in such a way that the mounting element 34 is sufficiently spaced from any components 78 present on the wall 16 of the observation space 12, so that the mounting element 34, serving to fix the spacer 28 on the insert 36, can be handled with ease.

Figure 3:
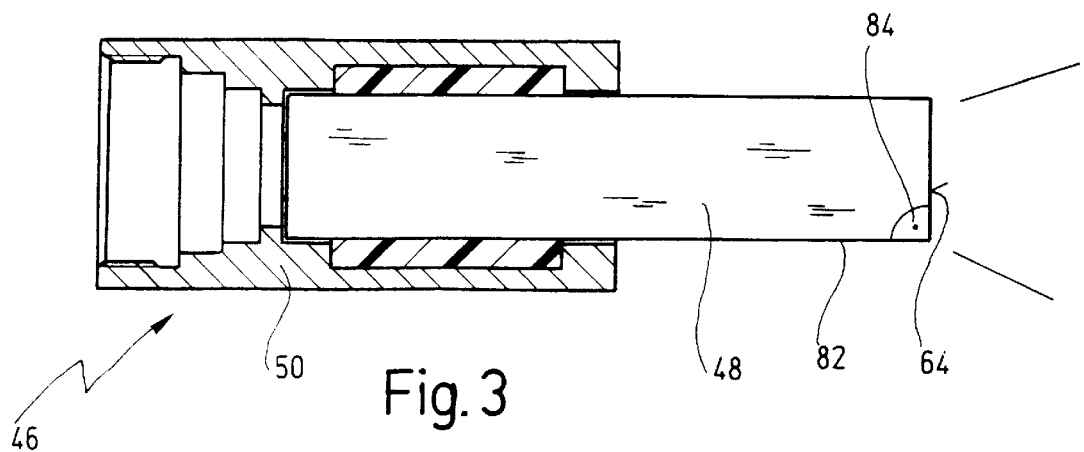
FIG. 3 shows a lengthwise section through a lighting head of the lighting system, corresponding to the lengthwise section of FIG. 2.
Figure 4:
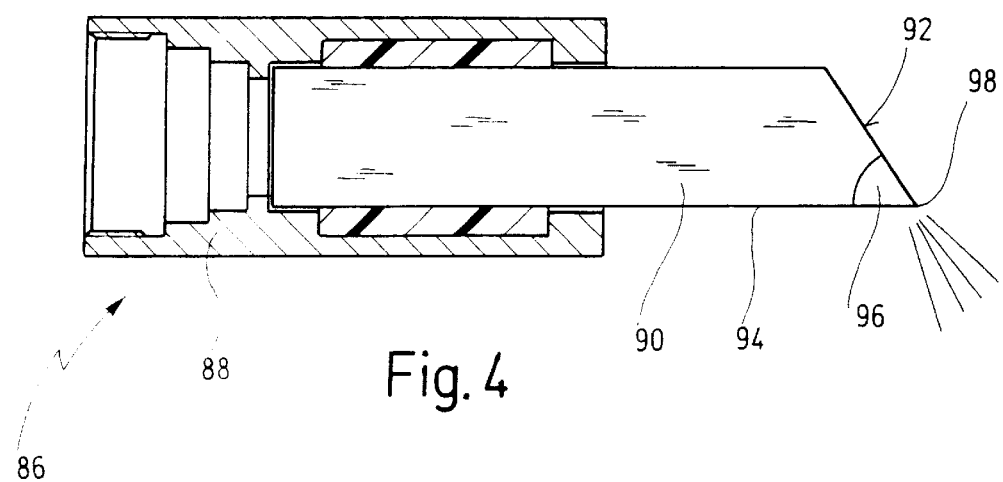
FIG. 4 shows a lengthwise section through another embodiment of a lighting head for use in the lighting system according to FIGS. 1 and 2.

FIG. 3 shows the lighting head 46 alone. The distal ground surface 64 of the light guide rod 48 is plane in shape, as has been mentioned before, and forms with a side line 82 of the light guide rod 48 a vertex angle 84 of 90°. With the ground surface 64 configured in this way, the light emerges from the ground surface 64 in the longitudinal direction of the light guide rod 48 under an acceptance angle of approximately 60°. The effective reflex surface is equal to the ground surface 64 in this case. FIG. 4 shows another embodiment of a lighting head 86, the lighting head 86 being substituted for the lighting head 46 in the lighting system 10. Correspondingly, the coupling sleeve 88 is configured identically to the coupling sleeve 50 of the lighting head 46. Contrary to the light guide rod 48 of the lighting head 46, the lighting head 86 comprises, however, a light guide rod 90 whose distal ground surface 92 forms with a side line 94 of the light guide rod 90 a vertex angle 96 of less than 90°. The vertex angle 96 is in the range of between 20° and 90°. With such a vertex angle an almost punctiform light exit from the vertex 98 of the ground surface 92 is achieved, with the light emerging obliquely to the longitudinal direction of the light guide rod 90.

Figure 5:
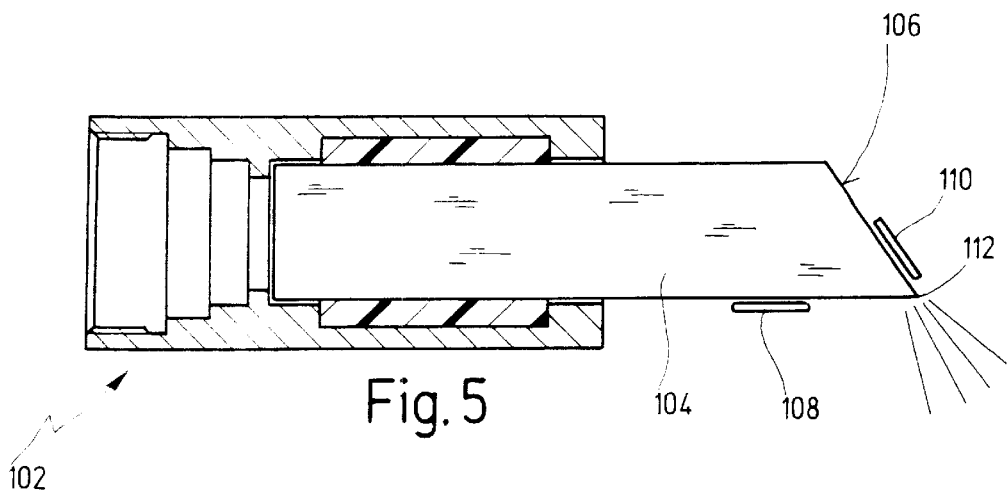
FIG. 5 shows likewise a lengthwise section, but through another embodiment of a lighting head for use in the lighting system according to FIGS. 1 and 2.

FIG. 5 finally shows another lighting head 102 whose light guide rod 104 also has an inclined ground surface 106, but where the surface of the light guide rod 104 is additionally provided with metallizations 108 and 110. The metallizations 108 and 110 consist of a temperature-resistant metal. The metallizations 108 and 110 act as mirrors by which the light guided in the light guide rod 104 is reflected, whereby the light is again coupled out from the distal end of the light guide rod 104, obliquely to the longitudinal direction.

What is claimed is:

1. A lighting system for illumination of an observation space, in particular an observation space in which a pressurized and/or hot medium is contained, comprising:

an optical-fiber cable having a first end which can be connected to a light source, and a second end;

a lighting head, which is connected to said second end of said optical fiber cable and which can be introduced into said observation space, wherein said lighting head comprises a removably attachable light guide rod in contact with gases within the observation space and made from a material which is resistant to pressure and temperature;

wherein said lighting head is without a protective glass and without a cooling apparatus;

wherein said light guide rod is provided at its proximal end with a coupling sleeve for connecting said light guide rod with said optical-fiber cable; and wherein said coupling sleeve is fixed to said light guide rod by means of an adhesive having a refractive index smaller than a refractive index of said light guide rod.

2. The lighting system of claim 1, wherein said adhesive is resistant to high temperatures.

3. The lighting system of claim 1, wherein said light guide rod is provided at its proximal end with a coupling sleeve for connecting said light guide rod with said optical-fiber cable, said coupling sleeve being fixed to said light guide rod at a proximal end of said light guide rod which comes to lie outside said observation space by means of an adhesive having a refractive index being smaller than a refractive index of said light guide rod.

4. The lighting system of claim 1, wherein said coupling sleeve is fixed to said light guide rod by means of an adhesive having a refractive index smaller than a refractive index of said light guide rod and wherein said adhesive is transparent at least in an area near a surface of said light guide rod.

5. The lighting system of claim 1, wherein said coupling sleeve is fixed to said light guide rod by means of an adhesive having a refractive index smaller than a refractive index of said light guide rod and wherein said adhesive is formulated on a silicone basis.

6. The lighting system of claim 1, wherein said light guide rod is metallized on at least part of its surface.

7. The lighting system of claim 6, wherein said metallization is formed from a metal that is resistant to high temperatures and wherein said metallization is covered by a protective coating.

8. The lighting system of claim 1, wherein said light guide rod is provided with a plane ground surface at its distal end, and said ground surface forms with a side line of said light guide rod a vertex angle in the range of between 20° and 90°.

9. The lighting system of claims 1, wherein a rigid spacer in the form of a shaft is arranged between said lighting head and said optical-fiber cable, said light guide rod being detachably connected with said spacer.

10. The lighting system of claim 9, wherein an insert is provided that can be fixed in an opening in a wall of said observation space outside the latter, in which case said spacer can be slid into said insert and can be fixed at a proximal end of said insert by means of a mounting element.

11. The lighting system of claim 10, wherein said mounting element is captively held on said spacer.

12. The lighting system of claim 9, wherein an insert is provided that can be fixed in an opening in a wall of said observation space outside the latter, in which case said spacer can be slid into said insert and can be fixed at a proximal end of said insert by means of a mounting element and wherein said mounting element is a cap nut or a bayonet ring.

13. The lighting system of claim 1, wherein said light guide rod is provided at its proximal end with a coupling sleeve for connecting said light guide rod with said optical-fiber cable, and wherein a rigid spacer in the form of a shaft is arranged between said lighting head and said optical-fiber cable, said light guide rod being detachably connected with said spacer, and wherein said coupling sleeve and said distal end of said spacer can be connected by screwing.

14. A lighting system for illumination of an observation space, in particular an observation space in which a pressurized and/or hot medium is contained, comprising:
   an optical-fiber cable having a first end which can be connected to a light source, and a second end;
   a lighting head, which is connected to said second end of said optical-fiber cable and which can be introduced into said observation space,
   wherein said lighting head comprises a light guide rod made from a material which is resistant to pressure and temperature and
   wherein said light guide rod is provided at its proximal end with a coupling sleeve for connecting said light guide rod with said optical-fiber cable, said coupling sleeve being fixed to said light guide rod at a proximal end of said light guide rod which comes to lie outside said observation space by means of an adhesive having a refractive index being smaller than a refractive index of said light guide rod.

15. The lighting system of claim 14, wherein said coupling sleeve is fixed to said light guide rod by means of an adhesive having a refractive index smaller than a refractive index of said light guide rod and wherein said adhesive is transparent at least in an area near a surface of said light guide rod.

16. The lighting system of claim 14, wherein said coupling sleeve is fixed to said light guide rod by means of an adhesive having a refractive index smaller than a refractive index of said light guide rod and wherein said adhesive is formulated on a silicone basis.

17. The lighting system of claim 14, wherein said light guide rod is metallized in at least one localized area, wherein the metal is resistant to high temperatures and covered by a protective coating.

18. The lighting system of claim 14, wherein said light guide rod is provided with a plane ground surface at its distal end.

19. The lighting system of claim 18, wherein said ground surface forms with a side line of said light guide rod a vertex angle in the range of between 20° and 90°.

20. The lighting system of claim 14, further comprising a rigid spacer placed between said lighting head and said optical-fiber cable, said light guide rod being detachably connected to said spacer and, wherein an insert is fixed in an opening in a wall of said observation space and said spacer is fixedly placed into at a proximal end of said insert.

21. The lighting system of claim 14, wherein an insert is provided that can be fixed in an opening in a wall of said observation space outside the latter, in which case said spacer can be slid into said insert and can be fixed at a proximal end of said insert by means of a mounting element and wherein said mounting element is a cap nut or a bayonet ring.

22. A lighting system for illumination of an observation space, in particular an observation space in which a pressurized and/or hot medium is contained, comprising:
   an optical-fiber cable having a first end which can be connected to a light source, and a second end;
   a lighting head, which is connected to said second end of said optical-fiber cable and which can be introduced into said observation space;
   wherein said lighting head comprises a removably attachable light guide rod in contact with gases within the observation space and made from a material which is resistant to pressure and temperature;
   wherein said lighting head is without a protective glass and without a cooling apparatus; and
   wherein said light guide rod is provided with a plane ground surface at its distal end.

23. A lighting system for illumination of an observation space, in particular an observation space in which a pressurized and/or hot medium is contained, comprising:
   an optical-fiber cable having a first end which can be connected to a light source, and a second end;
   a lighting head, which is connected to said second end of said optical-fiber cable and which can be introduced into said observation space;
   wherein said lighting head comprises a light guide rod made from a material which is resistant to pressure and temperature;
   wherein said light guide rod is provided at its proximal end with a coupling sleeve for connecting said light guide rod with said optical-fiber cable, said coupling sleeve being fixed to said light guide rod at a proximal end of said light guide rod which comes to lie outside said observation space by means of an adhesive having a refractive index being smaller than a refractive index of said light guide rod; and
   wherein said light guide rod is provided with a plane ground surface at its distal end.

* * * * *